March 9, 1954 J. E. CALLAHAN 2,671,365
THIMBLE-ENCLOSING RIGGER'S VISE
Filed Oct. 25, 1951 2 Sheets-Sheet 1
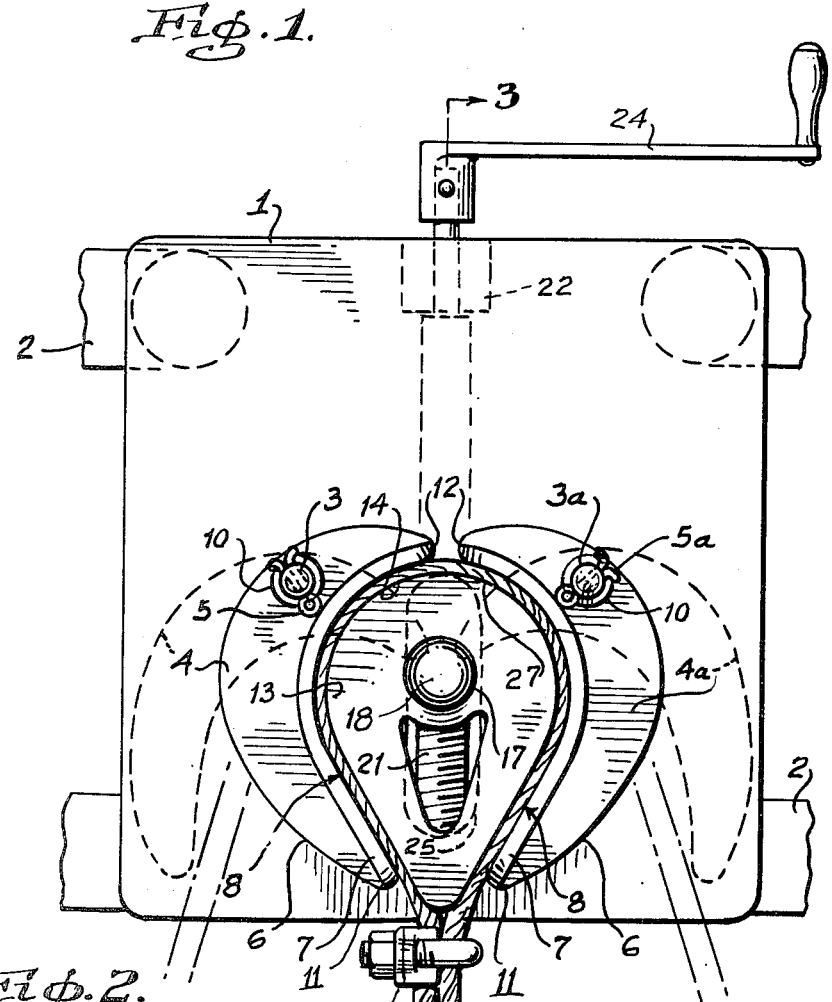
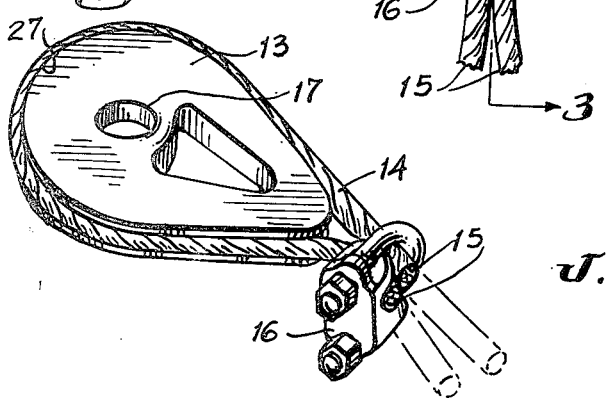
INVENTOR.
J. E. CALLAHAN
BY Philip Subkow
ATTORNEY.

March 9, 1954 — J. E. CALLAHAN — 2,671,365
THIMBLE-ENCLOSING RIGGER'S VISE
Filed Oct. 25, 1951 — 2 Sheets-Sheet 2
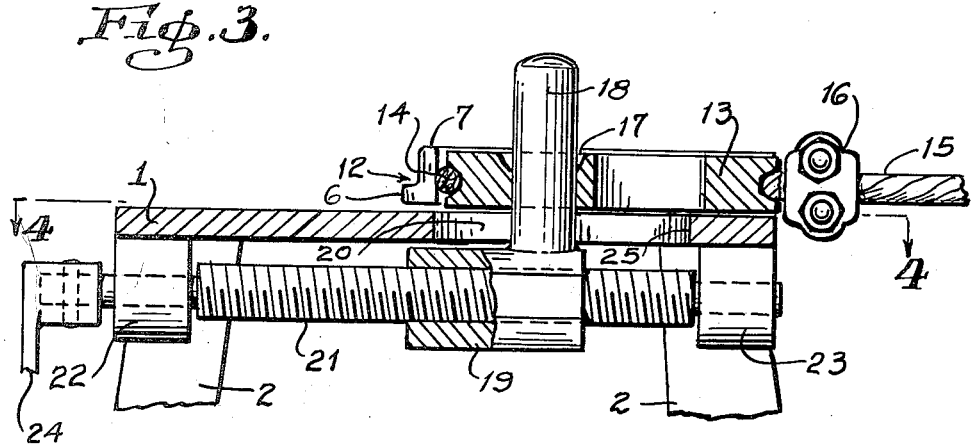
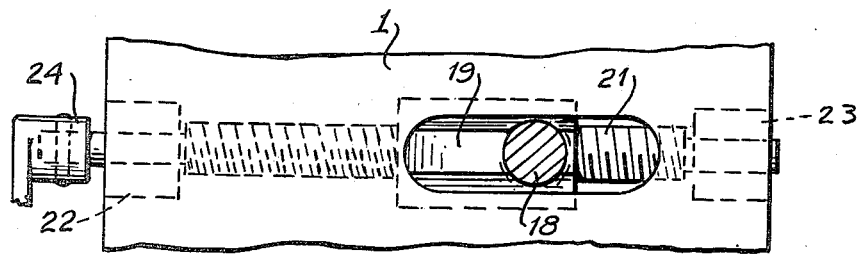
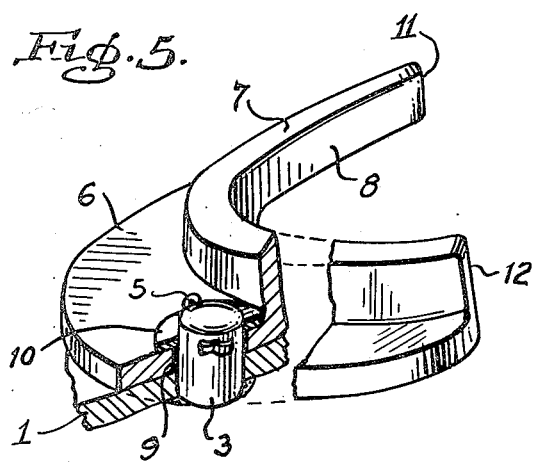
INVENTOR.
J. E. CALLAHAN
BY
Philip Subkow
ATTORNEY.

Patented Mar. 9, 1954

2,671,365

UNITED STATES PATENT OFFICE 2,671,365

THIMBLE-ENCLOSING RIGGER'S VISE

Jackson E. Callahan, Santa Barbara, Calif., assignor to Signal Oil and Gas Company, Los Angeles, Calif., a corporation of Delaware Application October 25, 1951, Serial No. 253,085

8 Claims. (Cl. 81—17.5)

This invention relates to a tool for mounting rope, and particularly wire rope, on spools, spindles, thimbles, or like devices about which the rope is to be secured.

This problem is a serious one where heavy, stiff wire ropes are to be wound and clamped or otherwise secured about such spools, spindles, thimbles or like devices (all of which devices will hereinafter be included in the general term "thimble") for mounting such stiff wire about such thimbles. This tool is comprised of a jaw clamp composed of at least two jaws so positioned that the thimble may be placed between the jaws thereof. The wire rope is placed loosely around the thimble so that the wire and the thimble are encompassed between the jaws. The inner face of the jaws may take the shape which it is desired that the rope assume when the wire is finally clamped about the thimble. Means are provided to actuate the jaws so that they close, and in so doing clamp the wire about the thimble.

In order to accomplish this result, I employ in my preferred embodiment a means for positioning the thimble between the jaws. I pivot the jaws and by moving the thimble in a line, preferably a line centrally between the jaws, the thimble actuates a lever which may be, and preferably is, an extension of the jaws, to cause the jaws to pivot and clamp about the thimble, forcing the wire into its desired position about the thimble.

In the preferred embodiment I pivot the jaws at a point intermediate their ends and cause the thimble to retract between the jaws in such way that the thimble abuts one end of each of the jaws, causing the jaws to pivot and close about the thimble.

These and other objects of my invention will be further understood by reference to the drawings, in which Fig. 1 is a plan view of the device of my invention;

Fig. 2 is a perspective of the rope clamped on the thimble;

Fig. 3 is a section taken on line 3—3 of Fig. 1;

Fig. 4 is a fragmentary section taken on line 4—4 of Fig. 3; and

Fig. 5 is a perspective view of one of the clamps with parts broken away and parts in section for clearer illustration.

The clamp has a table 1 mounted on legs 2. Pivots 3 and 3a are welded in place in the table 1 and the jaws 4 and 4a are pivoted on the fixed pivot pins 3 and 3a and held from displacement on the pivots by cotter pins 5 and 5a.

The jaws 4 and 4a are each formed so as to have a horizontal flange 6 and a vertical flange 7. The inner surfaces of the flange 7 are formed in a curved surface of a curvature whose character will be explained later. The pivot pins pass through a bore 9 in each jaw. It will be observed that the flange 6 of each jaw lies flat upon and slides over the table plate 1 when the jaws pivot on the pivot pins. Additionally, it will be observed that the pivot pins are each positioned intermediate the front end 11 and the back end 12 of the jaws. The curvature of the jaws between the ends 11 and 12 is in the form of an open C. The end 12 is re-entrant with respect to the end 11 in that it is on the backward curve of the clamp (see Fig. 1). The pivot point in each jaw is adjacent the end 12. The jaws are mounted in bilateral symmetry so that their corresponding ends face each other.

The two pivots 3 and 3a are mounted on a line which is substantially perpendicular to the center line between the pivoted jaws, and the pivot points are spaced apart for a distance which is sufficient to permit the jaws to open (as shown in Fig. 1 by broken lines), during which movement the ends 12 approach each other, but do not necessarily touch, while the front ends 11 of the jaws move apart. When the jaws have reached open position, I may place a thimble, illustrated by the thimble 13 (Fig. 2), between the opened jaws, and may then place a rope 14 loosely about the thimble and inside the curved jaw surfaces 8, so that the rope extends beyond the forward free ends 11 of both jaws 4 and 4a. By moving the rope 14 and thimble 13 backward against the inner jaw ends 12, the latter are forced back, thus causing each jaw body from its pivot point to the end 12 to act as a lever arm and thus causing the jaw 4 to swing counterclockwise and the jaw 4a to swing clockwise to clamp the rope about the thimble.

By making the curvature of the inner surface 8 of each jaw complementary to the curvature of thimble 13, the ends 15 of the rope are brought closely together and the rope is tightly held about the thimble 13 so that a clamp 16 may be placed about the free ends 15 of the rope.

To accomplish this movement of the thimble whereby the jaws 4 and 4a are actuated, I have provided a convenient mechanism illustrated in Figs. 1, 3, and 4. The thimble 13, having a curvature complementary to the curvature of the jaws, is provided with a bore 17 which is sufficient in diameter to fit smoothly, but not necessarily to form a tight fit, over a pin 18 mounted vertically on a nut 19 and passing through a slot 20 in the table 1. The thimble can thus be removably placed on the pin 18. The slot 20 is conveniently centrally positioned about a line passing centrally between the pivots 3 and 3a and perpendicular to the line joining the centers of these pivots. The nut 19 is a travelling nut mounted on a screw, whose ends are journalled in bearings 22 and 23 mounted underneath the table 1. The center line of the screw is conveniently substantially in the same vertical plane as the center line of the slot 20 so that the pin 18 may move freely in the slot 20 when the screw is rotated. A handle 24 is provided as a convenient means for rotating the screw.

It will be observed that, with the pin positioned near the front end 25 of the slot 20, the thimble 13 may be fitted onto the pin 18. The thimble is thus positioned so that the jaws 4 and 4a may be moved manually into open position. This permits of the positioning of the rope loosely about the thimble. The rope, if it is stiff, may be bent about the thimble so that it contacts the inner jaw ends 12, and then extends flat across the jaw surfaces 8, and thence beyond the free jaw ends 11. Upon rotation of the screw 21, the pin 18 and the thimble 13 are moved toward the back end of the slot 20. Since the back end 27 of the thimble abuts the rope 14 where it lies across the inner ends 12 of the jaws such backward movement of the thimble causes pivotal movement of the jaws and the consequent clamping of the rope between the jaws and thimble in the manner described above.

While I have described a particular embodiment of my invention for the purpose of illustration, it should be understood that various modifications and adaptations thereof may be made within the spirit of the invention as set forth in the appended claims.

I claim:

1. A device for clamping rope on thimbles, comprising a pair of spaced pivoted jaws, a pivot for each jaw, said pivots being spaced from each other, a lever connected to each jaw and extending inwardly from each jaw, and from corresponding sides of said pivots, a thimble, a thimble support mounted between said jaws, means for removably mounting said thimble on said thimble support, and means for moving said thimble support between said jaws to and from said levers.

2. A device for clamping rope on thimbles, which comprises two curved jaws, each jaw having a front and a back end, a pivot on each jaw, each pivot being placed near one end of said jaws, means for mounting said pivots in a line, a thimble, having a curvature complementary to said curved jaws, a thimble support movably mounted between said jaws, means for removably mounting said thimble on said thimble support, and means to move the thimble between said jaws.

3. A rope vise which comprises a pair of C-shaped jaws, a pivot for each jaw, means for mounting each jaw on said pivot, said jaws being mounted with like ends facing each other, the pivot on each jaw being adjacent the corresponding end of each jaw, a thimble, having a curvature complementary to the curvature of said jaws, a thimble support, means for removably mounting said thimble on said thimble support, and means for moving said support in a line perpendicular to a plane containing the axes of said pivots.

4. A rope vise which comprises a pair of C-shaped jaws, a pivot for each jaw, means for mounting each jaw on said pivot, said jaws being mounted with like ends facing each other, the pivot on each jaw being positioned adjacent the corresponding end of each jaw, a thimble support, a nut, said thimble support being mounted on said nut, a screw, the center line of said screw being perpendicular to a plane containing the axes of said pivots, a bearing for said screw, and means to rotate said screw.

5. A rope vise comprising a table, a pair of pivot pins mounted in said table, a pair of C-shaped jaws mounted on said pins so that their ends face each other, said pivot pins being located adjacent corresponding ends of said jaws, an elongate slot in said table extending between said pivot pins and said jaws, a screw rotatively mounted under said table, the center line of said screw lying parallel to the elongate axis of said slot, a nut on said screw, and a pin mounted on said nut and extending through said slot.

6. A rope vise which comprises a pair of C-shaped jaws, a pivot for each jaw, means for mounting each jaw on said pivot, said jaws being mounted with like ends facing each other, a thimble support, a nut, said thimble support being mounted on said nut, and a screw, the center line of said screw extending between said pivots.

7. A rope vise comprising a table, a pair of pivot pins mounted in said table, a pair of C-shaped jaws, said jaws being mounted on said pins so that their ends face each other, said pivot pins being located adjacent corresponding ends of said jaws, an elongated slot in said table extending between said pivot pins and said jaws, a pin extending through said slot, means for moving said pin in said slot in a line extending between said pivot pins and said jaws, said moving means including a screw, the center line of said screw lying parallel to said first mentioned line, and a nut on said screw, said pin being mounted on said nut.

8. A rope vise which comprises a pair of complementary opposing jaws, said jaws having complementary ends, said ends facing each other, a pivot for each jaw, a thimble support, a nut, said thimble support being mounted on said nut, a screw, the center line of said screw extending between said pivots and said jaws, and means to rotate said screw.

JACKSON E. CALLAHAN.

References Cited in the file of this patent

UNITED STATES PATENTS

| Number | Name | Date |
|---|---|---|
| 1,319,562 | Brown | Oct. 21, 1919 |
| 1,330,229 | Athimon | Feb. 10, 1920 |